Figure 1:
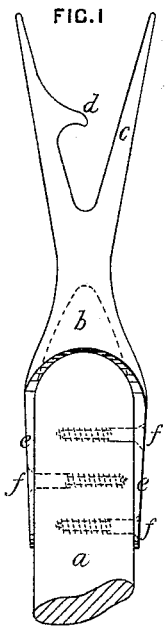

(No Model.)

L. E. FRIEND.
ATTACHMENT FOR CLOTHES PROPS.

No. 430,012. Patented June 10, 1890.

WITNESSES
John Revell
S. C. Connor

INVENTOR
Lucy Ella Friend
By her Attorneys
Howson and Howson

UNITED STATES PATENT OFFICE.

LUCY ELLA FRIEND, OF SYDNEY, NEW SOUTH WALES.

ATTACHMENT FOR CLOTHES-PROPS.

SPECIFICATION forming part of Letters Patent No. 430,012, dated June 10, 1890.

Application filed October 9, 1888. Serial No. 287,662. (No model.) Patented in New South Wales August 24, 1888, No. 888; in Victoria August 29, 1888, No. 6,113, and in England October 9, 1888, No. 14,509.

*To all whom it may concern:*

Be it known that I, LUCY ELLA FRIEND, a subject of the Queen of Great Britain and Ireland, and a resident of Sydney, in the Colony of New South Wales, have invented a certain Improved Attachment to Clothes-Props, (for which I have obtained Letters Patent in New South Wales, dated August 24, 1888, No. 888; Victoria, dated August 29, 1888, No. 6,113, and Great Britain, dated October 9, 1888, No. 14,509,) of which the following is a specification.

My invention relates to an improved attachment to be secured to the ends of clothes-props, whereby that implement may serve as a prop whichever end is used, while the opposite end affords a more secure grip on the ground or floor.

The attachment is constructed preferably of malleable cast-iron, and consists of a short socket, which is extended on one or both sides, so as to form a strap or straps which shall extend longitudinally along the pole, and which when properly secured to the pole or prop by screws or otherwise bind the attachment and hold it firmly onto the extremity of the prop. Beyond the socket and forming the extreme end of the prop is a two-pronged fork of any shape most suitable for the purpose—*i. e.*, the prongs may be straight or curved, or one prong may be made longer than the other, as is the case with boat-hooks. In order to prevent the line from slipping out from between the prongs of the fork I provide a catch for the clothes-line, and for this purpose I make one or both prongs undercut, so as to form a projection or projections against which the line may catch if the prop by any accident should slip. These projections are formed at some distance from the outer ends of the prongs to facilitate the catching of the line with the uppermost attachment, and secondly, that the prongs at the lower end of the pole may sink deep into the ground to get a good hold.

In the accompanying drawings, Figures 1, 2, 3, and 4 show some of the different forms in which I propose to make the improved attachment.

$a\ a$ are the wooden poles or props, $b\ b$ the short sockets into which the extremities of the props $a$ fit, and $c\ c'\ c^2\ c^3$ are some of the forms to which the prongs of the forks may be adapted. The catch may be formed by a single projection $d$ on one of the prongs of the fork, as in Figs. 1 and 3, or by projections $d$ on both prongs, as in Figs. 2 and 4, so as to prevent the line from slipping and the prop falling. Straps $e$ secure the attachment to the pole or prop by means of the screws $f\ f$.

Figure 2:
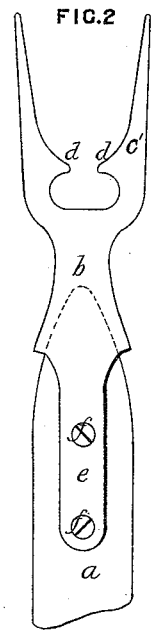
Figure 3:
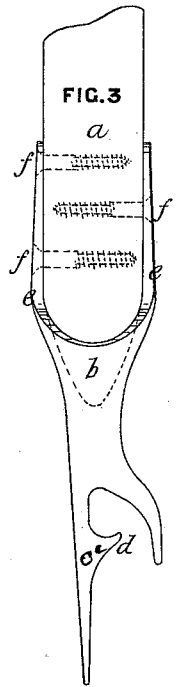
Figure 4:
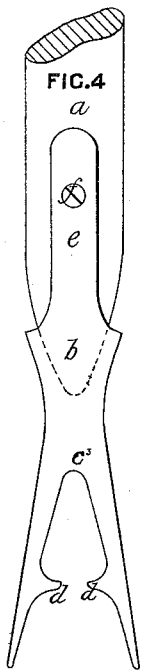

In the drawings, Figs. 1 and 2 show the attachment fixed to the top of a prop, while Figs. 3 and 4 show it fixed to the bottom of a prop.

As stated above, one of the advantages of the attachment is that either end of the prop may be used indifferently.

I claim as my invention—

1. An attachment for a clothes-pole having a socket for the reception of the end of the pole and a two-pronged fork, the prongs being sharp-pointed and provided with a catch on the inside at some distance from the end, as and for the purpose set forth.

2. A clothes-pole having its opposite ends provided with attachments, each consisting of a socket, a two-pronged fork with sharp prongs and a catch on the inside of the prongs at some distance from the end, as and for the purpose set forth.

3. An attachment for a clothes-pole, having a socket for the reception of the end of the pole and a two-pronged fork, the prongs being sharp-pointed and provided with a catch consisting of two projections $d$ on the inner sides of the prongs at some distance from the end, as and for the purpose set forth.

In testimony whereof I have signed my name to this specification in the presence of two subscribing witnesses.

LUCY ELLA FRIEND.

Witnesses:
ARTHUR G. FRIEND,
MANFIELD NEWTON.